Figure 1:
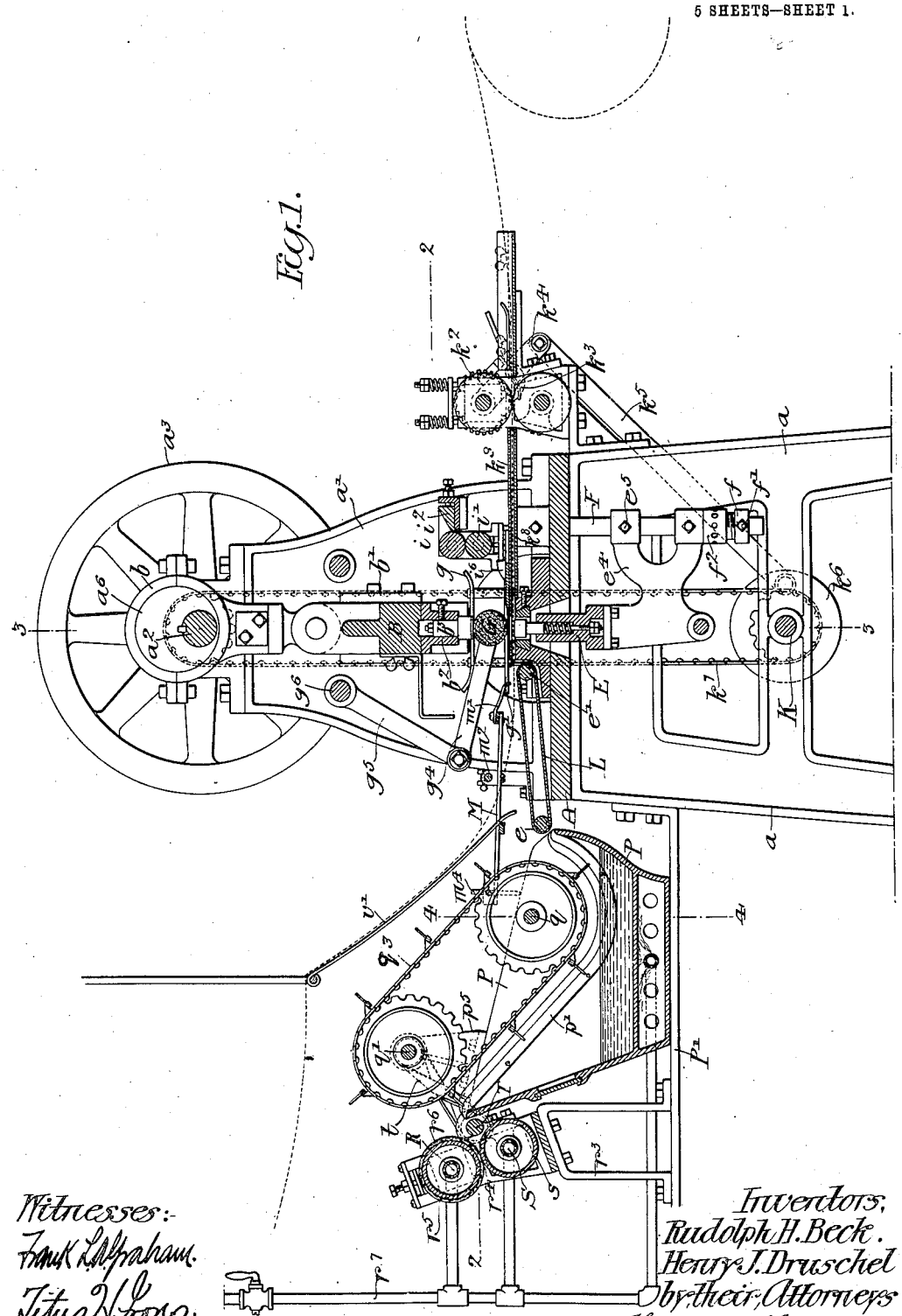

No. 799,624. PATENTED SEPT. 19, 1905.
R. H. BECK & H. J. DRUSCHEL.
CAP MAKING MACHINE.
APPLICATION FILED APR. 30, 1904.

5 SHEETS—SHEET 1.

Witnesses:—

Inventors;
Rudolph H. Beck.
Henry J. Druschel
by their Attorneys

No. 799,624. PATENTED SEPT. 19, 1905.
R. H. BECK & H. J. DRUSCHEL.
CAP MAKING MACHINE.
APPLICATION FILED APR. 30, 1904.

5 SHEETS—SHEET 2.

Witnesses:
Frank L. A. Graham
Titus N. Irons

Inventors,
Rudolph H. Beck.
Henry J. Druschel,
by their Attorneys,

No. 799,624. PATENTED SEPT. 19, 1905.
R. H. BECK & H. J. DRUSCHEL.
CAP MAKING MACHINE.
APPLICATION FILED APR. 30, 1904.
5 SHEETS—SHEET 3.
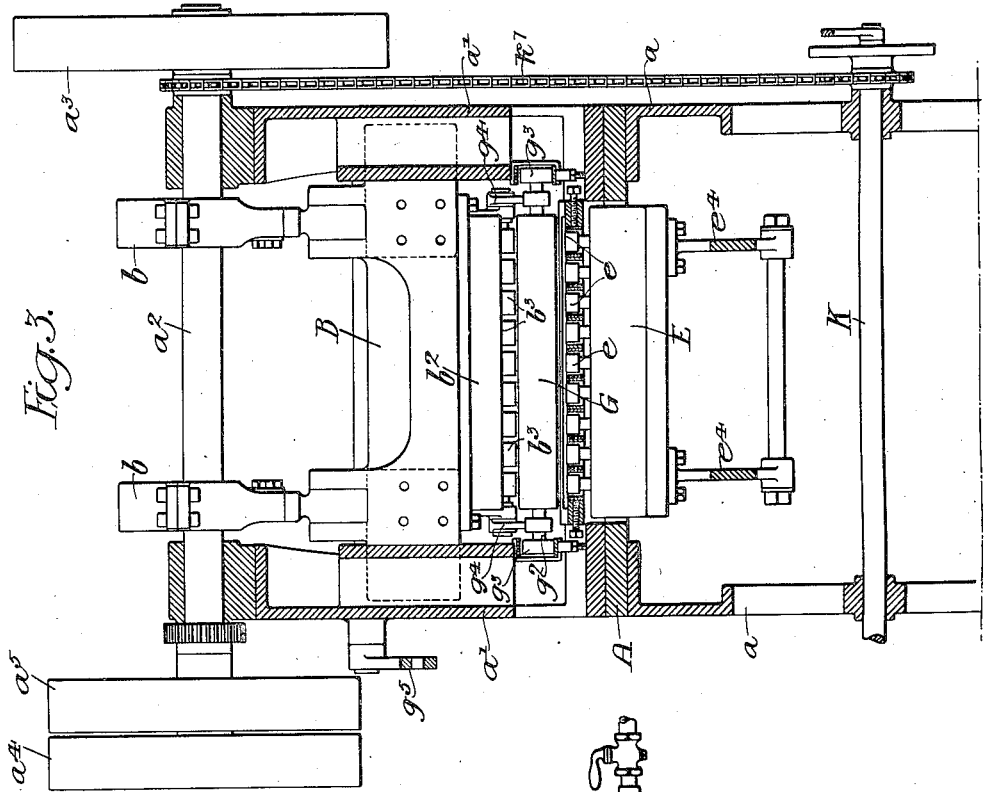
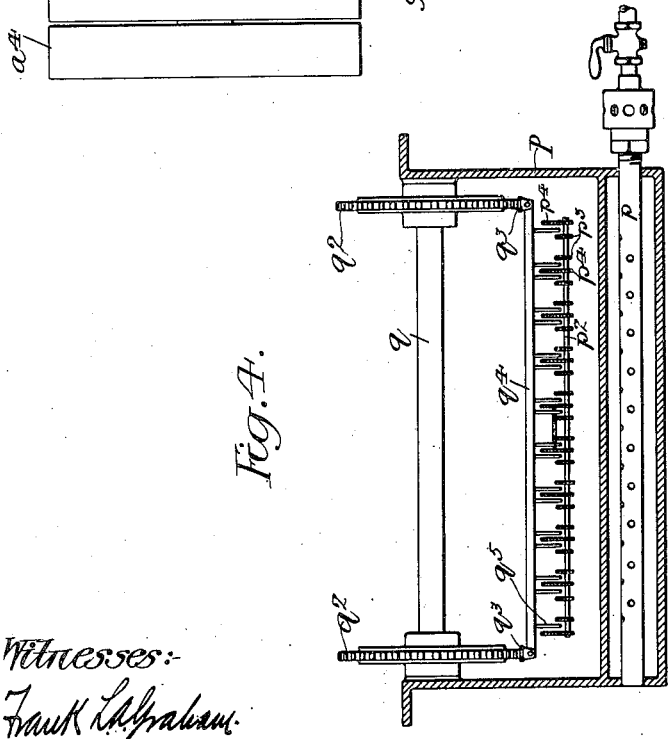
Witnesses:—
Frank L. Graham.
Titus H. Lyons.
Inventors:
Rudolph H. Beck,
Henry J. Druschel,
by their Attorneys,
Howson & Howson No. 799,624. PATENTED SEPT. 19, 1905.
R. H. BECK & H. J. DRUSCHEL.
CAP MAKING MACHINE.
APPLICATION FILED APR. 30, 1904.

5 SHEETS—SHEET 4.

Witnesses:

Inventors,
Rudolph H. Beck,
Henry J. Druschel,
by their Attorneys,

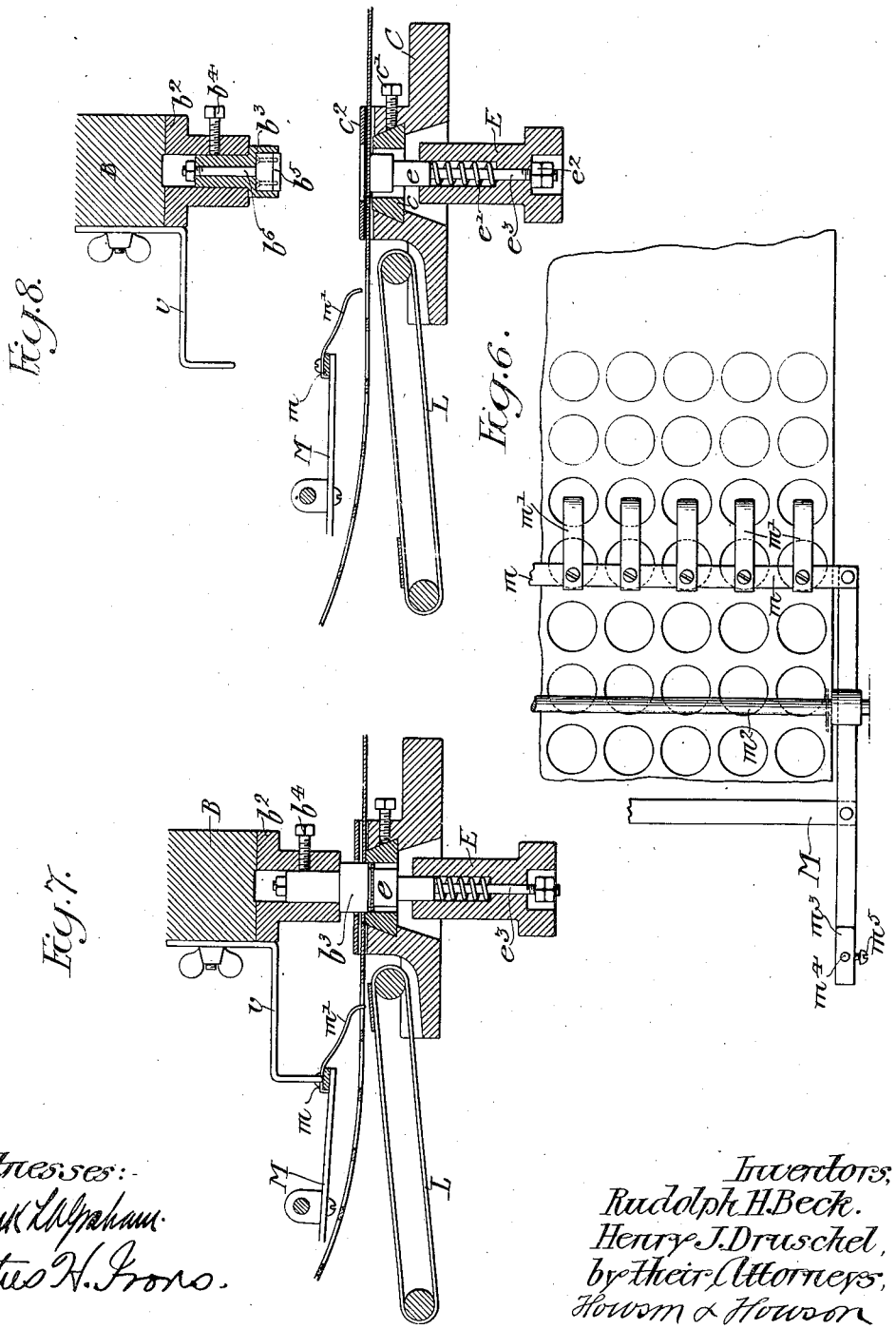

UNITED STATES PATENT OFFICE.

RUDOLPH H. BECK AND HENRY J. DRUSCHEL, OF PHILADELPHIA, PENNSYLVANIA, ASSIGNORS, BY DIRECT AND MESNE ASSIGNMENTS, TO THE BECK MANUFACTURING COMPANY, OF PHILADELPHIA, PENNSYLVANIA, A CORPORATION OF NEW JERSEY.

CAP-MAKING MACHINE.

No. 799,624.　　　Specification of Letters Patent.　　　Patented Sept. 19, 1905.

Application filed April 30, 1904. Serial No. 205,810.

*To all whom it may concern:*

Be it known that we, RUDOLPH H. BECK, a citizen of the United States, and HENRY J. DRUSCHEL, a subject of the German Emperor, both residing in Philadelphia, Pennsylvania, have invented certain Improvements in Cap-Making Machines, of which the following is a specification.

One object of our invention is to provide a machine which after automatically cutting a succession of pieces of any desired shape from a sheet of material shall immerse said pieces in liquid and finally remove the surplus liquid from them.

It is further desired to so construct the machine for accomplishing the above-noted object that it shall not only be substantial and not likely to get out of order, but shall also be relatively simple as to the arrangement of its parts and efficient in operation.

Another object of the invention is to provide a novel device for cutting articles, such as paper caps for bottles, from a sheet of paper or cardboard, which, after causing a die to sever and remove a cap or caps from such sheet, shall return said piece to the hole in the sheet from which it was originally cut, and by causing motion of said sheet thereby convey the piece or pieces to any desired point.

The invention also contemplates a novel device for punching or cutting a succession of pieces from a sheet of material in combination with means for automatically removing said pieces from the holes in the sheet from which they have been cut.

More particularly by our invention we propose to provide a machine for simultaneously cutting a number of paper caps for milk-bottles from a continuous sheet of cardboard and causing the sheet itself to act as the conveyer for removing the cut-out caps from the vicinity of the punches, thereafter causing automatic mechanism to periodically displace the caps from the holes in said sheet. Our machine provides for caps so removed a conveyer which deposits them in a vessel containing liquified paraffin and employs a device which, after permitting each cap or series of caps cut by one operation of the machine to remain in the liquid for a predetermined time, delivers the caps to a pair of squeeze-rolls, which remove the surplus liquid still adhering to them.

These objects we attain as hereinafter set forth, reference being had to the accompanying drawings, in which—

Figure 2:
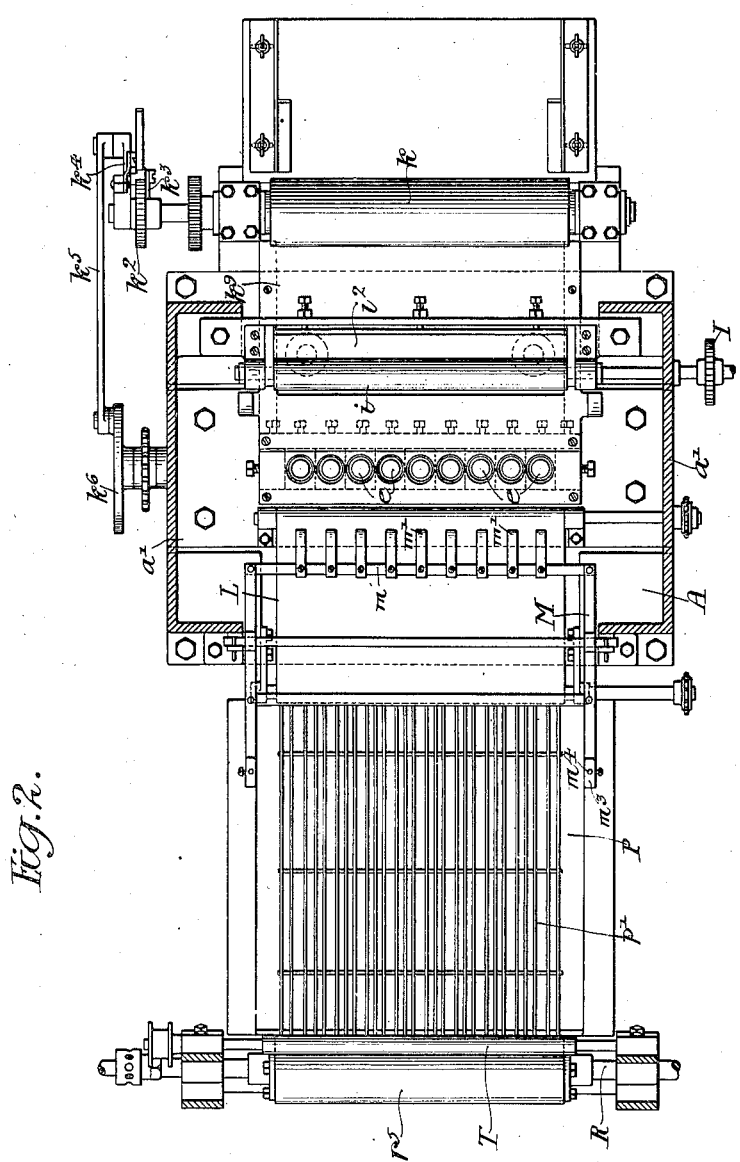
Figure 5:
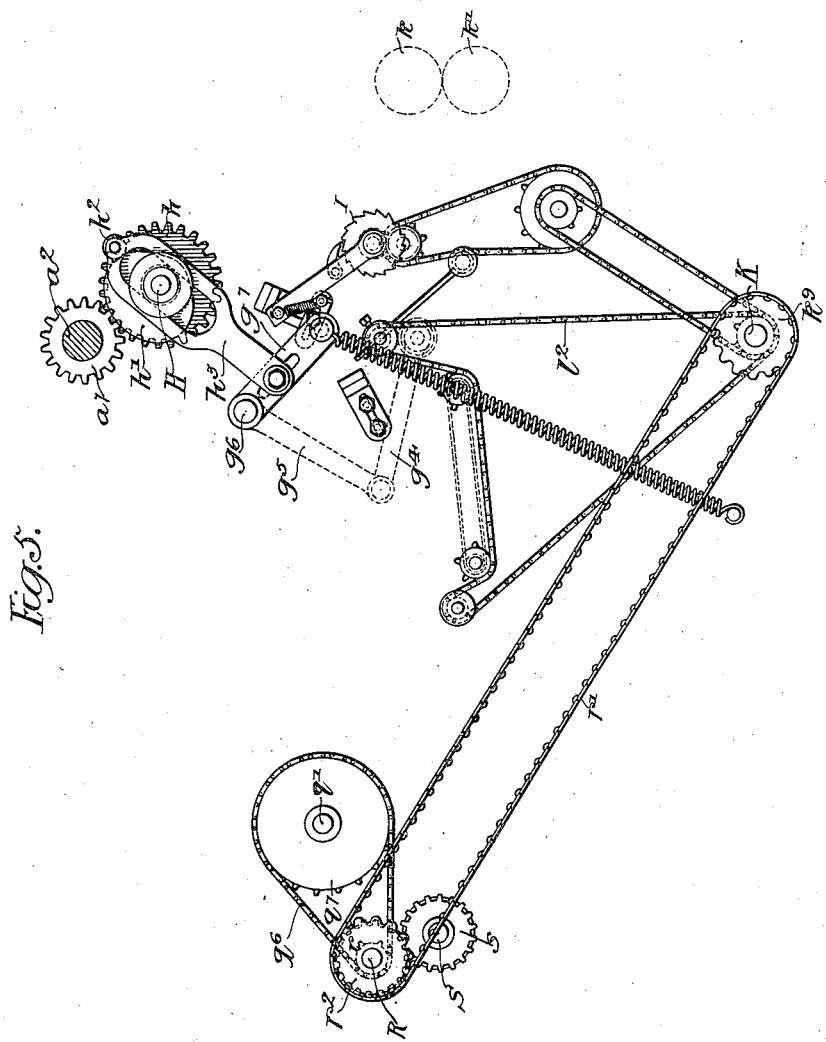

Figure 1 is a sectional elevation showing the detail arrangement and construction of the parts comprising our invention. Fig. 2 is a plan view, partly in section, taken on the line 2 2, Fig. 1. Fig. 3 is a sectional elevation of our machine, taken on the line 3 3, Fig. 1, and showing the detail arrangement of the parts comprising the punching mechanism. Fig. 4 is a sectional elevation taken on the line 4 4, Fig. 1, illustrating the detailed construction of a portion of the guideways and conveyer within the paraffin-container. Fig. 5 is a detached elevation showing, to some extent diagrammatically, the gearing for operating the various portions of our machine. Fig. 6 is a plan view of a portion of our machine, illustrating the means by which a successive series of cut-out caps are removed from the sheet of paper from which they have been cut and by which they have been conveyed from the punches; and Figs. 7 and 8 are sectional elevations illustrating in detail the construction and operation of a single one of the punches for cutting the caps from a sheet of cardboard.

While we have shown in the above drawings and shall hereinafter describe our machine as applied to the manufacture of pasteboard caps, it will be understood that the device may be employed to cut out from a sheet of material any desired form of piece, depending solely upon the punch and die used, and while we have employed paraffin for saturating our caps it will be understood that the device is applicable for coating or saturating pieces of any form or material with any desired liquid.

In the above drawings, A is a base-plate carried by a pair of standards or frames $a$ and in turn carrying two other standards $a'$ at each side. These latter standards are provided with bearings for the main shaft $a^2$ of the machine, upon which is a fly-wheel $a^3$ and fast and loose pulleys $a^4$ and $a^5$. There are also upon said shaft two eccentrics $a^6$ and straps $b$, to which is connected a reciprocable head B, having plates $b'$ serving to guide it upon the standards $a'$. Fixed to the head and extending transversely of the machine is a casting $b^2$, having in it a number of recesses, in which are placed the punches $b^3$, these latter having enlarged lower portions, so as to provide a shoulder, as shown in Figs. 7 and 8, in engagement with the lower face of the casting $b^2$ and being held in their respective recesses by set-screws $b^4$. Each punch is provided with a die or plate $b^5$, held in its face portion by means of a bolt $b^6$, which plate is provided with type for printing upon the pieces cut out. Held in any desired manner to the base-plate A and immediately under the punch-carrying head $b^2$ is a plate C, provided with a series of dies $c$, which are retained in position by set-screws $c'$ and so placed as to coact with the punches $b^3$. Immediately above said dies is a transversely-extending plate $c^2$, serving as a stripper for preventing the sheet of material operated upon from being lifted by the punches on their upward movement. There is extending into each of the dies $c$ a plunger $e$, supported in recesses of the head E, each of which is provided with a spring $e'$, whose pressure upon its plungers may be adjusted by a pair of nuts $e^2$, screwed upon the threaded end of a bolt $e^3$, fastened to or forming part of the said plunger. The head E is carried upon a pair of arms $e^4$, each slidably mounted a vertically-placed bar F, which has at its lower end a threaded collar $f$, held in position by means of a set-screw $f'$. A nut $f^2$ is placed between this collar $f$ and the arm $e^4$, so that by revolution of this nut said arms, and with them the head E, together with the plungers carried thereby, may be raised or lowered to any desired extent. There are in the arms $e^4$ set-screws $e^5$, by which said arms may be rigidly held to the bar F after having been once adjusted.

Suitably carried by each of the standards $a'$ are a pair of guides $g$ and $g'$, suitably placed to secure wheels or rollers $g^3$ upon the shaft $g^2$ of an inking-roller G, so as to direct this latter into contact with the type carried by the various punches. Connected to said shaft $g^2$ are a pair of arms $g^4$, fastened to the ends of levers $g^5$ upon a shaft $g^6$, journaled in the standard $a'$. In Fig. 5 is shown the mechanism by which this shaft is oscillated to cause the roller G to be moved periodically under the punches, and this includes a gear $a^7$ on the main shaft $a^2$, meshing with a gear $h$ on a shaft H, which shaft also carries a cam $h'$ in engagement with a roller $h^2$ upon a slotted arm $h^3$. The shaft H extends through the slot in said arm, which has adjustably connected to it a second arm $g^7$, fixed in turn to the shaft $g^6$. By this means the revolution of the main shaft $a^2$ causes the cam $h'$ to reciprocate the slotted arm $h^3$, and hence to oscillate the shaft $g^6$ as required.

Extending parallel to the face of the roller G are a pair of rollers $i$ and $i'$, having a reservoir $i^2$, from which they are supplied with ink. Pawl-and-ratchet mechanism I (shown in Fig. 5) is provided for the purpose of turning these rollers, and it will be noted that the connection between the arms $h^3$ and $g^7$ is so adjusted that on each stroke the roller G is guided into contact with the lower roller $i'$ by means of a small cam-surface $i^6$, which is placed, as shown in Fig. 1, to engage the rollers $g^3$.

In order to feed cardboard or other sheet material to the machine, we provide a pair of nip-rolls $k$ and $k'$ and periodically turn one of these by means of a ratchet-wheel $k^2$, fastened to a shaft of the roll $k$ and acted upon by a pawl $k^3$, carried on an arm $k^4$. To the end of the arm is connected a rod $k^5$, pinned to a crank $k^6$ on a shaft K, operating in bearings in the lower standards or frames $a$, which shaft is continuously driven by means of a chain or belt $k^7$, extending between sprocket-wheels upon said shaft K and upon the main driving-shaft $a^2$.

Upon the side of the punches and dies opposite to the nip-rolls and slightly below the level thereof is a conveyer belt or apron L, mounted upon a pair of rollers $l$ and $l'$, which by reference to Fig. 5 will be seen to be operated by a chain $l^2$, engaging suitable sprocket-wheels carried by said rollers and also a sprocket-wheel upon the shaft K, which is driven as above noted. Extending over the conveying-belt L is a bar $m$, upon which are carried a series of fingers $m'$, so placed that their ends are directly above and in the line of motion of the caps cut from the sheet of material operated on. Said bar $m$ forms part of a frame M, pivotally supported on a transversely-extending rod $m^2$, it being noted that the side members of said frame extend to the rear of this rod and carry weights $m^3$, by which the bar $m$ and its attached fingers are normally maintained in an elevated position. Pins $m^4$ pass through the respective weights and are adjustably held in engagement with the edges of a container P by means of set-screws $m^5$, thereby rendering possible the regulating of the position of the frame M. Said container is used to hold and keep melted a body of paraffin, as shown in Fig. 1, there being under it a perforated gas-pipe $p$ of the construction well known in the art, which is inclosed by the suitably-formed sides of the container.

Extending from the edge of the container adjacent to the end of the apron or conveyer L into the liquid in the container and up to the opposite side of said container are a series of bars or rods forming a screen or guideway $p'$ for the reception of the caps delivered by said conveyer L. The individual bars forming said screen are preferably, as shown in Fig. 4, of two different sizes, so assembled and held in position by a series of transverse rods $p^2$ that a separate guideway is formed for the reception of all the caps delivered from any one punch. In assembling these parts in place, two relatively narrow bars $p^3$ between each two relatively wide ones $p^4$, as will be evident from an inspection of Fig. 4. Two shafts $q$ and $q'$ are carried in suitable bearings in the container P and in standards $p^5$, respectively, and have fixed to them chain-wheels $q^2$, there being a chain $q^3$ extending between each pair of these wheels. Said two chains are connected at intervals by cross-bars $q^4$, from which project a series of pins or fingers $q^5$, so placed that there are two of them to each of the guideways formed by the bars $p^3$ and $p^4$ of the screen $p'$. The shaft $q'$ is driven by a chain $q^6$, passing around suitable sprocket-wheels $q^7$ and $r$, respectively, upon it and on the shaft R, while this latter shaft is driven by a chain $r'$, which engages sprocket-wheels $r^2$ and $k^9$ upon it and upon the shaft K, respectively.

It will be seen that the container P is carried upon the arm or bracket P', supported directly from one of the standards $a$ of the machine, and said bracket also carries a supporting-frame $r^3$, having standards $r^4$, in which are journaled the shafts R and S. The former of these shafts carries a hollow roll $r^5$, having a felt covering $r^6$ and coacting with a second hollow roll $s$, carried by the shaft S, which is also hollow. Both of these shafts are provided with burner attachments, as shown in Fig. 2, whereby they may be supplied with gas from a pipe $r^7$ and heated.

From Fig. 5 it will be seen that the shaft S, and consequently the roll $s$, are positively driven by a gear $s'$, meshing with a second gear carried by the shaft R. A relatively small roll T is placed to receive the paper caps from the guideways of the screen $p$ and deliver them to the squeeze-rolls $r^5$ and $s$, there being a belt $t$, (shown in Fig. 1,) actuated from the shaft $q'$, by which this roll T is driven.

In operation sheet-paper or pasteboard is delivered, preferably from a roll, to the periodically-operated nip-rolls $k$ and $k'$, which intermittently deliver it to the machine through a covered guideway formed by a pair of parallel plates $k^8$ and $k^9$. As soon as the sheet passes under the line of punches and dies the actions illustrated in Figs. 7 and 8 take place—*i. e.*, the punches are forced through it and carry the pieces cut therefrom below the surface of the dies, the springs $e'$ yielding sufficiently to permit plungers $c$ to be forced downwardly, as shown in Fig. 7. As the punches rise the caps or pieces cut out are forced upwardly by the plungers until they are restored to their original positions in the sheet from which they were punched, as in Fig. 8, and the mechanism is so timed that as soon as the punches have been freed from the sheet of material this is again moved forward by the nip-rolls, carrying with it all of the pieces that have been cut out. After the punches have made a second stroke and again cleared the sheet the line of caps first formed is brought immediately under the line of fingers $m'$, and when the third stroke is made by the machine an arm $v$, carried by the reciprocating punch-head B, is brought into engagement with the finger-carrying bar $m$, turning the frame M upon its pivot-shaft and forcing the fingers $m'$ against the pieces still carried by the sheet of material board. Such action forces said pieces out of the holes in the sheet and deposits them upon the conveying-apron L, from which they are delivered to their respective guideways in the screen $p'$. The pins $q^5$, carried by cross-bars $q^4$, will engage a set of caps and after moving them through the melted paraffin within the container P will push them upwardly along their guideways, so as to permit most of the surplus liquid to drain from them and finally deliver them to the roll T. From here they are passed through the squeeze-rolls $r^5$ and $s$, which being heated quickly remove whatever surplus material still adheres to said caps and discharge them into any desired receptacle or receptacles. The felt or other covering $r^6$ upon the roll $r^5$ is designed to absorb the surplus liquid from the caps; but it is obvious that, if desired, other means may be provided for disposing of said liquid. After passing under the fingers $m'$ the sheet of material from which the pieces have been punched is guided over the machine by bars $v'$, as indicated by the dotted lines in Fig. 1, and disposed of in any desired manner.

By providing type in the punches and means for periodically inking the same we are enabled to simultaneously cut out and print each cap in the manner well known to the art, while by providing separate guideways for the caps delivered from each punch it is possible to produce and separately deliver caps each with different matter printed upon them.

We claim as our invention—

1. The combination in a punching-machine, of a frame, a device thereon for cutting and removing pieces of material from a sheet of the same, said device including a die with a plunger and a standard on the frame supporting the same independently of the die, said plunger being constructed to return cut-out pieces of material to the holes in the sheet of the same, with means for moving the sheet and an automatic device for periodically removing the pieces from the holes in said sheet, substantially as described.

2. The combination in a punching-machine, of a device for cutting and removing pieces of material from a sheet of the same, said device including means for returning said cut-out pieces to the holes in the sheet, means for moving the sheet, a movably-supported finger, with an arm movable independently of the finger and attached to the cutting device for actuating the finger to finally remove the pieces from the holes of said sheet, substantially as described.

3. The combination in a punching-machine, of a device for cutting and removing pieces of material from a sheet of the same, means for feeding the sheet, a movably-supported finger, and an arm movable independently of said finger, said arm being attached to said cutting device and being placed to actuate said finger to finally remove cut-out pieces from the holes of said sheet, substantially as described.

4. The combination of means for feeding material, a reciprocable head, a series of punches carried thereby, a series of dies for said punches including means for returning pieces to the holes in the sheet from which they have been cut by said punches, with a device for removing successive series of pieces from said holes, said device including a series of dischargers and a single structure connected to a reciprocable head for simultaneously actuating said dischargers substantially as described.

5. The combination of sheet-feeding means, a series of punches having means whereby they are reciprocated, a series of dies for said punches including means for returning pieces to the holes in the sheet from which they have been cut by said punches, with a series of fingers supported independently of the reciprocating means having means whereby they are made to simultaneously remove the pieces of a series from the holes in said sheet, substantially as described.

6. The combination of sheet-feeding means, a reciprocating head punches carried thereby, a series of dies for said punches constructed to permit the punches to first cut pieces and afterward replace said pieces in a sheet of material, a frame carrying fingers, and an arm on the said head for moving the frame to cause the fingers to remove the cut-out pieces from the sheet, substantially as described.

7. The combination of a movable head having a series of punches, a series of dies for the punches, a relatively fixed head, a series of yieldingly-supported plungers carried by the head and respectively projecting into the dies, with means for adjusting said head toward and from the dies so as to simultaneously adjust the said series of plungers, substantially as described.

8. The combination of a movable head, a punch carried thereby, a die, a head adjacent to said die, a plunger carried by the head and projecting into the die, said plunger having a spring interposed between it and the head, means for adjusting the position of the plunger in said head, and means independent of said first means for bodily adjusting the plunger-carrying head relatively to the die, substantially as described.

9. The combination of a movable head, a punch carried thereby, a die, a head adjacent to the die, a plunger carried by the head and projecting into the die, said plunger having a spring interposed between it and the head and also having means for adjusting its position in said head, and means for bodily adjusting the plunger-carrying head relatively to the die substantially as described.

10. The combination with a machine for cutting out a piece from a sheet and then returning the piece to the sheet, of a pivotally-supported finger and mechanism for periodically actuating said finger to cause it to successively remove cut-out pieces from the sheet, substantially as described.

11. The combination with a machine for cutting out a piece from a sheet and then returning the piece to the sheet, of means for feeding the sheet, a pivotally-supported frame having a weight and a finger, with an arm on said machine placed to periodically engage the frame and cause the fingers thereof to remove pieces from the sheet, substantially as described.

12. The combination with mechanism for cutting holes in a sheet and returning pieces cut out to said holes, of an oscillating frame having a finger, means for periodically moving the frame and means for adjusting the frame to vary the position of the finger relatively to the sheet of material operated on, substantially as described.

13. The combination of a frame having side standards and provided with a series of dies, a reciprocable head guided by said standards, punches carried by said head and coöperating with the dies, a second head extending under the dies and having a series of yieldingly-supported plungers extending adjacent to the same, with a frame to simultaneously adjust said plungers supporting said second head and including means for vertically adjusting the same, substantially as described.

14. The combination of a main frame, a reciprocable head guided thereon, punches on the head, dies carried by the frame, an auxiliary frame carried by said main frame provided with plungers extending adjacent to the dies, with mechanism for vertically adjusting said auxiliary frame to simultaneously adjust said plungers, substantially as described.

In testimony whereof we have signed our names to this specification in the presence of two subscribing witnesses.

RUDOLPH H. BECK.
HENRY J. DRUSCHEL.

Witnesses:
WILLIAM E. BRADLEY,
JOS. H. KLEIN.